United States Patent [19]
Kremen

[11] 4,402,305
[45] Sep. 6, 1983

[54] APPARATUS FOR HEATING A SWIMMING POOL

[76] Inventor: Richard D. Kremen, 3205 N. Salida Del Sol, Chandler, Ariz. 85224

[21] Appl. No.: 236,656

[22] Filed: Feb. 23, 1981

[51] Int. Cl.³ .............................................. F24J 3/02
[52] U.S. Cl. ..................................... 126/415; 4/502; 4/503; 126/426; 126/449
[58] Field of Search ............... 126/415, 416, 426, 449; 4/495, 500, 501, 502, 503

[56] References Cited

U.S. PATENT DOCUMENTS

| | | | |
|---|---|---|---|
| 2,580,555 | 1/1952 | Kroeger | 126/415 |
| 2,996,729 | 8/1961 | Bailey | 126/415 |
| 3,277,498 | 10/1966 | Kleinbard et al. | 4/502 |
| 3,541,615 | 11/1970 | Myrtha | 4/503 |
| 3,982,286 | 9/1976 | Foster | 4/502 |
| 4,091,800 | 5/1978 | Fletcher | 126/415 |
| 4,137,575 | 2/1979 | Klaffke | 4/498 |
| 4,191,167 | 3/1980 | Ignatjev | 126/415 |
| 4,195,622 | 4/1980 | Dolza | 126/415 |
| 4,284,059 | 8/1981 | Thomason | 126/415 |
| 4,313,421 | 2/1982 | Trihey | 4/502 |

FOREIGN PATENT DOCUMENTS 2710313 9/1978 Fed. Rep. of Germany ...... 126/415

Primary Examiner—Daniel J. O'Connor
Attorney, Agent, or Firm—Harry M. Weiss

[57] ABSTRACT

This disclosure relates to a solar heater apparatus for a swimming pool which incorporates a submersible suspendible black body sheet to serve as a device to absorb solar radiation and transfer the collected energy to the pool water so that the pool water can be efficiently heated.

1 Claim, 7 Drawing Figures

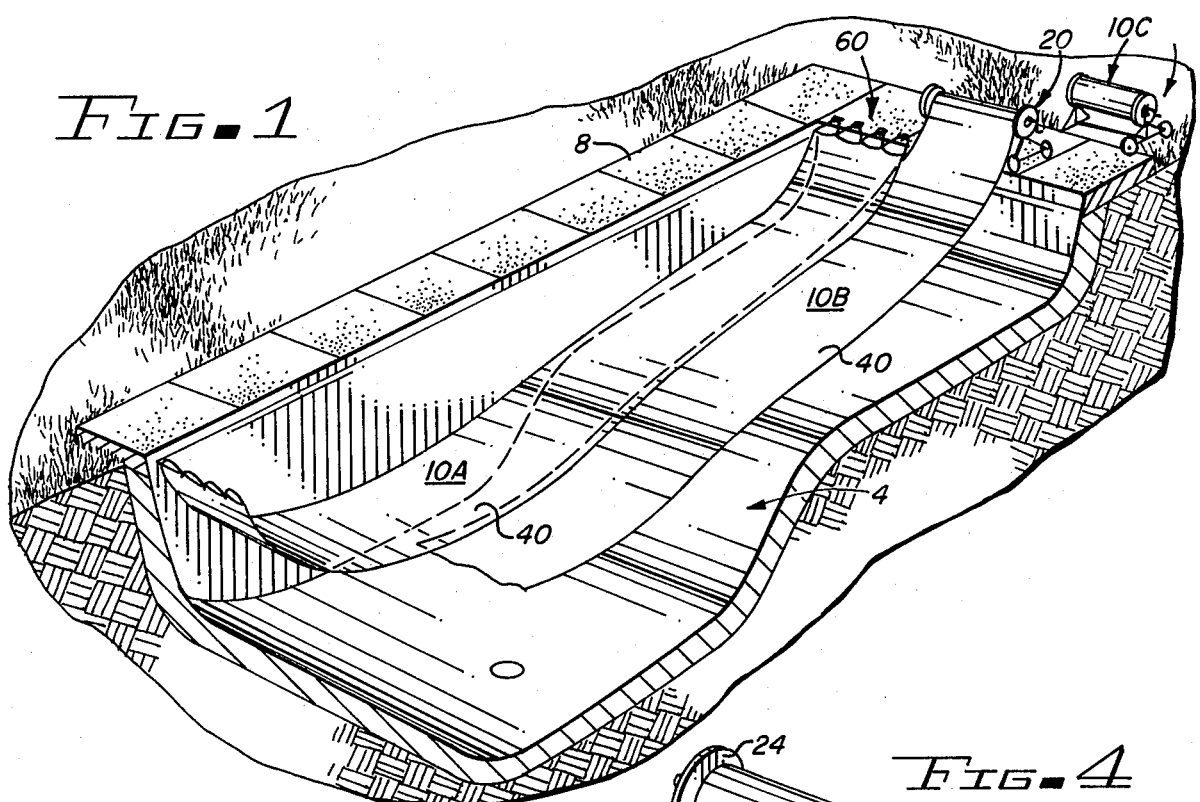
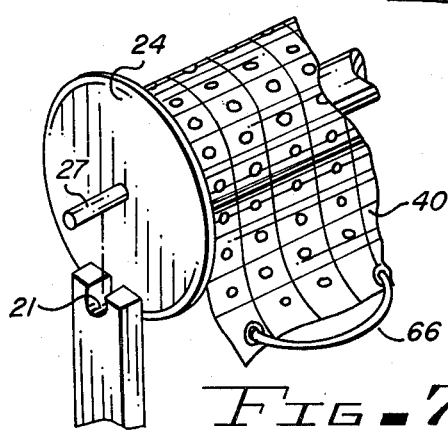
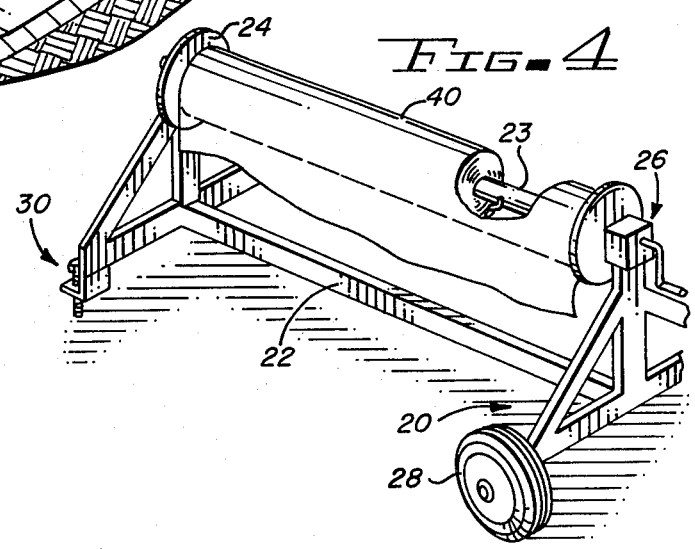
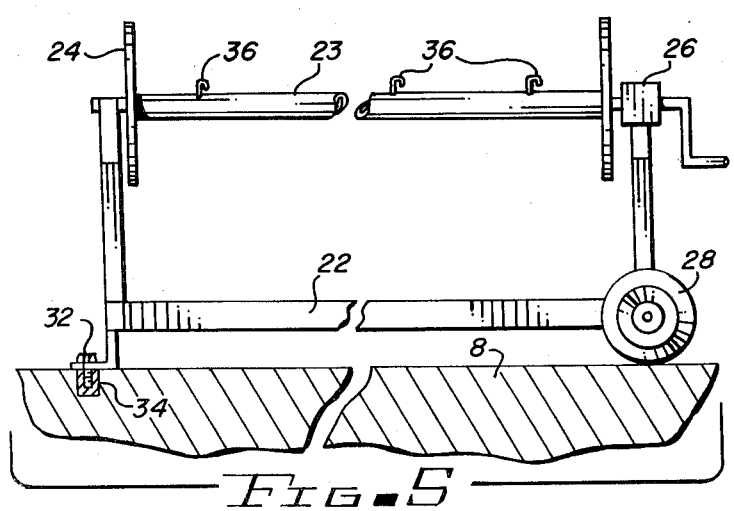
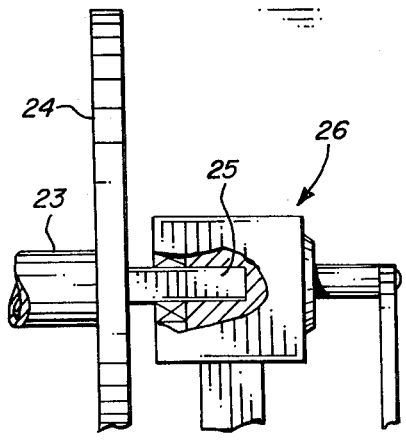

APPARATUS FOR HEATING A SWIMMING POOL

BACKGROUND OF THE INVENTION

1. Field of the Invention

This invention relates generally to heating apparatus, and, more specifically, to a passive solar heating apparatus particularly suited to use in a swimming pool as a pool heater.

2. Description of the Prior Art

In the past, swimming has become a preferred form of healthful recreation for a substantial portion of the populace. For convenience, many people have installed swimming pools at home. Since comfort required that the temperature of the water in the pool not fall substantially below 70 degrees Farenheit, people were generally faced with a choice between using the swimming pool only in the warm summer months, or installing a pool heater to heat the water to substantially extend the swimming season. Typically, such pool heaters utilized electricity or natural gas as an energy source for the required heat. While such energy sources were once "penny cheap," the cost of both electricity or natural gas have risen steadily. Since heating a swimming pool required a substantial energy input, that rise in the cost of energy has turned the operation of such pool heaters into an expensive luxury.

Another approach to heating the water in a swimming pool has been to utilize the free energy radiating from the sun. While the actual energy input required to operate a solar heater is minimal, the hardware required for such an installation has been expensive. Additionally, installation of such a solar heater apparatus in a pool not already equipped with a heater device required extensive reworking of the pool plumbing, generally rendering the addition of such a solar heater financially impractical. A need existed for a low-cost pool heater apparatus which required neither expensive energy inputs nor extensive modification of an existing pool for installation.

BRIEF DESCRIPTION OF THE DRAWING

FIG. 1 is a cutaway perspective view of a swimming pool with first, second and third examples of the herein disclosed heater apparatus shown in various stages of deployment.

FIG. 4 is a perspective view of a cart portion of the suspension apparatus of the swimming pool heater.

FIG. 5 is an elevational view of the cart coupled to an end of the swimming pool.

FIG. 6 is an enlarged partially sectional view of the drive apparatus of the cart.

FIG. 7 is an enlarged perspective view of a bearing end of the cart apparatus.

SUMMARY OF THE INVENTION

Figure 2:
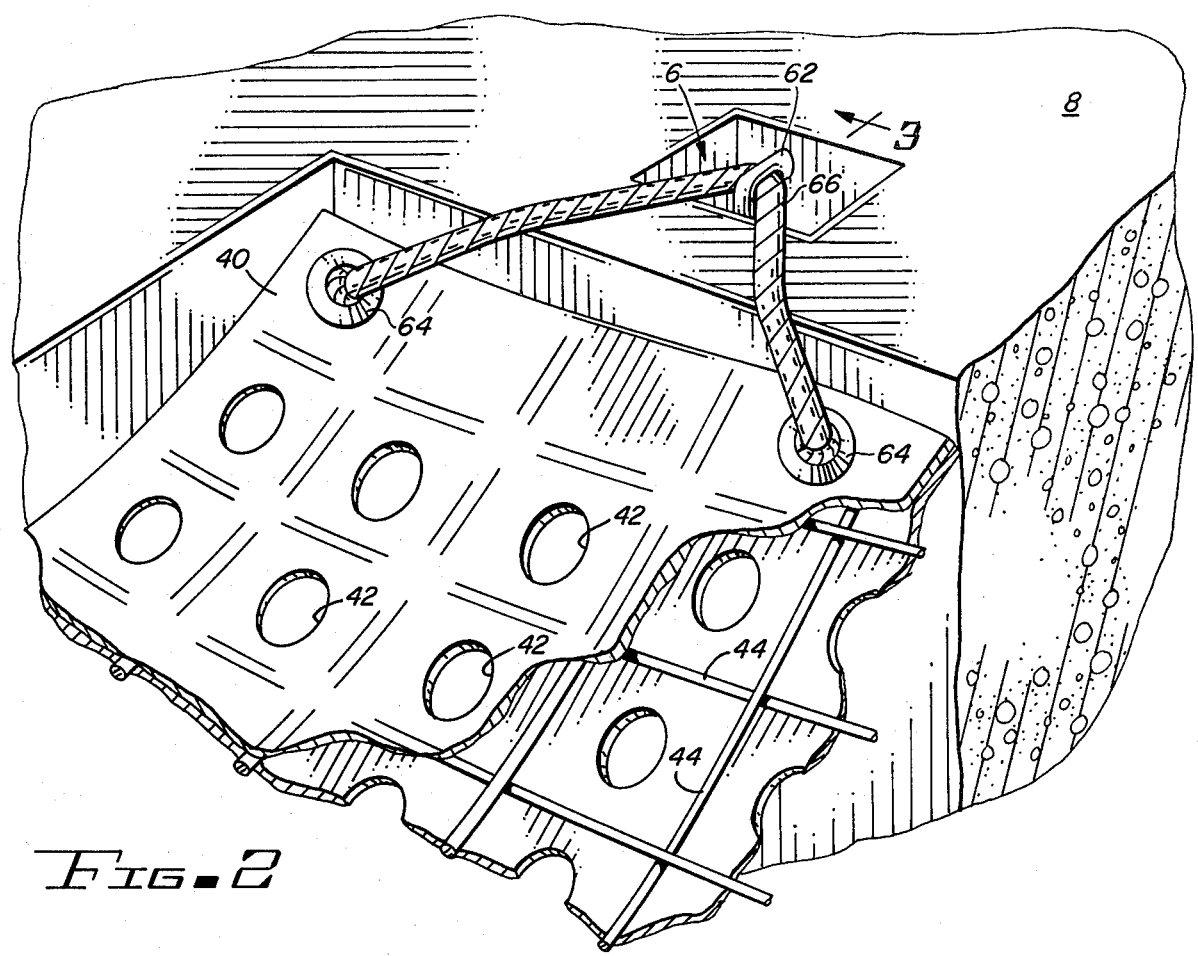
FIG. 2 is an enlarged perspective view of the connection between the heater apparatus and the swimming pool.

In accordance with one embodiment of this invention, it is an object to provide a low-cost passive solar swimming pool heater apparatus.

It is another object to provide a passive solar swimming pool heater apparatus which is readily removable to permit unimpeded use of the swimming pool.

It is a further object to provide a cart apparatus to permit ready installation and removal of a submersible passive solar swimming pool heater apparatus.

It is again another object to provide a sound, rot resisting structure for a submersible passive solar collector.

DESCRIPTION OF THE PREFERRED EMBODIMENTS

In accordance with one embodiment of this invention, a solar pool heater apparatus is disclosed, comprising: liner means for absorbing solar radiation; and suspension means for removably suspending the liner means in the pool.

In accordance with another embodiment of this invention, a method for heating the contents of a pool is disclosed, comprising the steps of: removably suspending a black body in the pool; and exposing the black body to solar radiation.

The foregoing and other objects, features and advantages of this invention will be apparent from the following more particular description of the preferred embodiments of the invention as illustrated in the accompanying drawings.

Referring to FIG. 1, three separate ones of the herein disclosed pool heater apparatus are generally shown respectively by reference numbers 10A, 10B and 10C. The pool heater apparatus 10A is shown installed in a typical swimming pool 4. The pool heater 10B is shown partially unreeled from a cart 20, being installed in (or removed from) the pool 4. The pool heater 10C is shown mounted on another cart 20, prepared for storage or transportation to or from the pool 4. The heater apparatus 10 is thus particularly well suited to use in existing swimming pools 4 which do not have provision for installation of a conventional solar heating system relying upon external collectors to gather the solar energy.

The pool heater 10 is provided with a fabric sheet 40 which can be unrolled into, and suspended within, a pool 4 to provide a high degree of solar absorbtivity. Natural convection within the pool water removes the collected energy from the sheet 40 to substantially prevent re-radiation of the absorbed energy while also warming the water. Maximum effectiveness can be obtained by suspending the sheet 40 at or near the bottom of the tool 4, permitting natural convection to circulate the coldest portions of the pool water past the surface of sheet 40. The fabric sheet 40 is preferably black, to maximize absorbtivity. The actual material of the fabric sheet 40 is light weight to permit ready manipulation of the heater 10, but of necessity has a specific gravity greater than one, so that when installed in the pool 4, it sinks below the surface to effectively heat the water. The preferred embodiment of the heater apparatus 10 utilizes a carbon black ethylene-propylene rubber material for the fabric sheet 40. The rubber material can be a continuous thin layer, or alternatively can be overlaid upon a backing sheet of other material, as for example rip-stop nylon or a cord matrix (refer also to FIG. 2). Thus, it can be seen that a removable light weight pool heater apparatus 10 is provided which is simple to use, relatively low in initial cost, and which requires only solar energy input for operation. Depending upon the dimensions of the swimming pool and the width of the sheet 40 employed, one or more of the sheets 40 may be used to provide optimal heating of the pool 4.

As shown by the heater 10A, the fabric sheet 40 can be supported in the pool 4 by a suspension means, or apparatus, as shown generally by reference number 60. To permit unobstructed use of the pool 4, the fabric sheet can be removed and stored upon the cart 20, which is another portion of the suspension apparatus 60. Thus, the entire heater apparatus 10 can be moved from poolside and stored in another convenient location.

Referring also to FIG. 2, an enlarged perspective view of the coupling between the sheet 40 and the suspension apparatus 60 is shown. The suspension apparatus 60 is provided with a series of hooks, a first of which is shown by reference number 63, which are inset into the opposed ends of the pool 4.

Portions of the fabric sheet 40 are removed to reveal the internal structure. The sheet 40 is vented with a multiplicity of apertures 42 to permit a flow of water therethrough both to allow the sheet 40 to sink, and to enhance natural convection. Structural integrity is provided for the sheet 40 by a matrix of cords 44 coupled thereto. The cords 44 are preferably comprised of a material which exhibits substantial tensile strength, but which is also relatively impervious to rot. Typical examples of such cords 44 would include polyethylene or nylon cords. The grommets 64 are each inset within an individual cell of the matrix formed by the cords 44. Thus, the grommets 64 can transmit stresses, arising when the heater 10 is suspended in the pool 4 or is being wound onto the cart 20, to the entire section of the sheet 40 without tearing or other damage.

Figure 3:
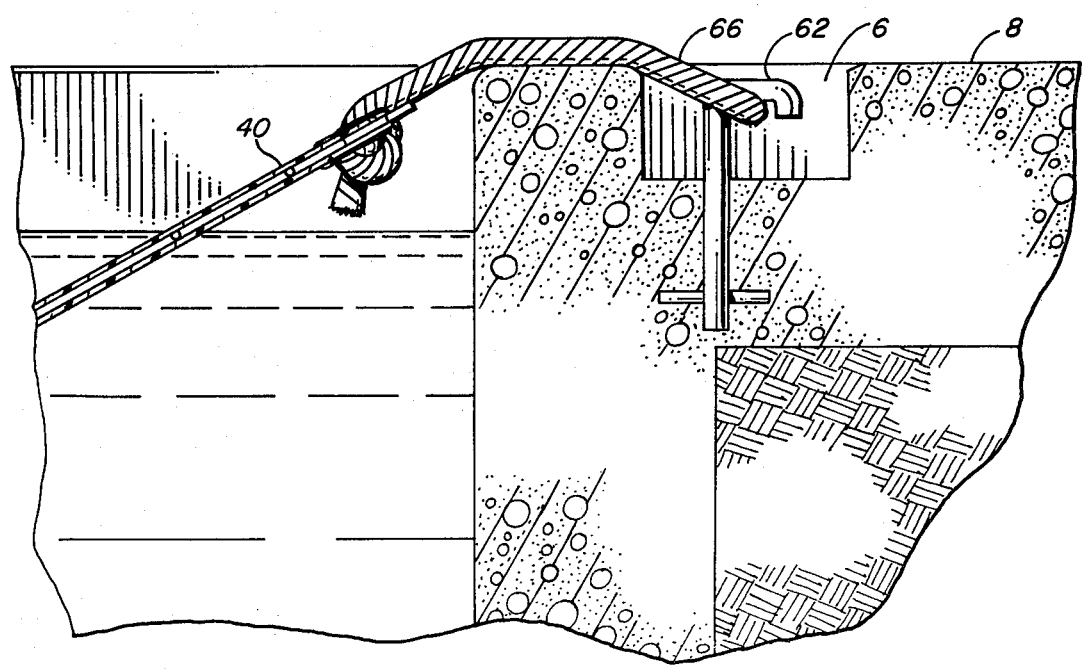
FIG. 3 is a sectional elevational view taken along line 3—3 of FIG. 2.

Referring also to FIG. 3, one of the hooks 62 is shown conveniently anchored in a recess 6 in an apron 8 of the pool 4. Such a recess 6 permits the heater 10 to be suspended while avoiding protruding obstructions at poolside. The suspension apparatus 60 is also provided with a series of grommets 64 inset into the corresponding opposed ends of the sheet 40. The grommets 64 can either be hooked directly onto the hooks 62, or alternatively can have a line 66 threaded through the grommets 64 which allows the line 66 to be engaged onto the hooks 62.

Referring then to FIG. 4, a perspective view of the fabric sheet 40 stored on the cart 20 is shown. The cart 20 is provided with a frame 22, a spool 24 both rotatably and removably coupled to the frame 22, and a drive apparatus 26 for conveniently winding the fabric sheet 40 onto a mandrel 23 of the spool 24. The drive apparatus 26 is of a well known handle driven type, and is provided with a ratchet mechanism disposed to retain the position of the fabric sheet 40 to prevent "backsliding" if the drive mechanism 26 is released while the sheet is being wound about the mandrel 23. The ratchet mechanism can also be released to allow a smooth, uninterrupted unreeling of the fabric sheet 40 from the spool 24 into the pool 4.

To permit ready transport of the cart apparatus 20, a pair of wheels, a first of which is shown by reference number 28, are coupled to a first end of the frame 22. To provide stability when the fabric sheet 40 is being installed in or removed from the pool 4, the cart is also provided at a second end with an anchor apparatus as shown generally by reference number 30.

Referring further to FIG. 5, an elevational view of the cart 20 with the fabric sheet 40 removed is shown.

As shown, the anchor apparatus 30 can be simply at least one, and more preferably two, threaded fasteners 32 engaged in corresponding threaded inserts 34 set into an apron 8 of the pool 4. The mandrel 23 of the cart apparatus 20 is provided with a series of fingers 36 which can individually be coupled to either the grommets 64 or portions of the line 66 reeved through the grommets 64.

Referring then to FIG. 6, an enlarged elevational view of the drive apparatus 26 is shown with portions removed to show the drive coupling between a square shank 25 of the spool 24, and the other portions of the drive apparatus 26. The square shank 25 drivably engages the drive apparatus 26, but is also slidably mounted therein to permit removal of the spool apparatus 24 from the drive apparatus 26. In this manner one cart 20 can be used to retrieve or unreel multiple fabric sheets 40 on individual spools 24, thus allowing the series of fabric sheets 40 required for heating even a large pool 8 to be compactly stored.

Referring further to FIG. 7, an enlarged perspective view of an end of the spool apparatus 24 is shown with a reeled-up fabric sheet 40 mounted thereon. The spool apparatus 24 is also shown provided with an axle 27 which is rotatably, but removably, engaged by a yoke portion 21 of the frame 22.

While the invention has been particularly described and shown in reference to the preferred embodiments thereof, it will be understood by those skilled in the art that various changes in form and detail and omissions may be made therein without departing from the spirit and scope of the invention.

What is claimed is:

1. A solar pool heater apparatus, comprising:

liner means for absorbing solar radiation, said liner means comprising a fabric sheet having high absorbtivity, and a specific gravity greater than one, said fabric sheet having a plurality of apertures therethrough;

said liner means further comprising reinforcing means for providing said fabric sheet with substantial tensile strength, said reinforcing means comprising a matrix of interconnected cords coupled to said fabric sheet, said cords comprising nylon cords, said suspension means comprising:

grommet means having portions set in opposed first and second ends of said fabric sheet for providing structurally sound attachment points in said fabric sheet; and hook means coupled to opposed ends of said pool for engaging said grommet means so that said fabric sheet can be suspended in said pool to absorb solar radiation, said suspension means further comprising cart means for storing said fabric sheet out of said pool and further for transporting said fabric sheet to and from said pool, said cart means comprising:

spool means for rolling and unrolling said fabric sheet about an axis of said spool means; and drive means coupled to said spool means for controllably rotating said spool means.

* * * * *